(12) United States Patent
Mizuta

(10) Patent No.: US 7,644,934 B2
(45) Date of Patent: Jan. 12, 2010

(54) VEHICLE WITH COMBINED ROLL ANGLE CONTROL AND ROLL RIGIDITY FRONT/REAR ALLOTMENT RATIO CONTROL, AND CONTROL METHOD FOR THE SAME

(75) Inventor: Yuichi Mizuta, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 470 days.

(21) Appl. No.: 11/539,060

(22) Filed: Oct. 5, 2006

(65) Prior Publication Data

US 2007/0088476 A1    Apr. 19, 2007

(30) Foreign Application Priority Data

Oct. 7, 2005    (JP) .............................. 2005-294662

(51) Int. Cl.
*B60G 17/016*    (2006.01)
(52) U.S. Cl. .................... 280/5.506; 280/5.508; 701/38
(58) Field of Classification Search .............. 280/5.506, 280/5.507, 5.508, 5.51, 5.512; 701/38
See application file for complete search history.

(56) References Cited

U.S. PATENT DOCUMENTS

| | | | | |
|---|---|---|---|---|
| 4,624,477 A | * | 11/1986 | Kumagai et al. | 280/5.512 |
| 4,712,807 A | * | 12/1987 | Kurosawa | 280/5.508 |
| 4,830,394 A | * | 5/1989 | Tanaka et al. | 280/5.512 |
| 5,088,759 A | * | 2/1992 | Takehara et al. | 280/5.507 |
| 5,116,078 A | * | 5/1992 | Kanazawa et al. | 280/5.503 |
| 5,251,136 A | * | 10/1993 | Fukuyama et al. | 701/38 |
| 5,253,174 A | * | 10/1993 | Inagaki et al. | 701/38 |
| 5,684,698 A | * | 11/1997 | Fujii et al. | 701/38 |
| 6,179,310 B1 | * | 1/2001 | Clare et al. | 280/124.159 |
| 6,711,482 B2 | * | 3/2004 | Shiino et al. | 701/37 |
| 2005/0179221 A1 | * | 8/2005 | Yasui et al. | 280/5.506 |
| 2005/0192728 A1 | * | 9/2005 | Yasui et al. | 701/38 |

FOREIGN PATENT DOCUMENTS

| | | |
|---|---|---|
| DE | 42 01 496 A1 | 7/1992 |
| DE | 698 14 957 T2 | 3/2004 |
| JP | 2-193749 | 7/1990 |
| JP | 2-296513 | 12/1990 |
| JP | 2-303910 | 12/1990 |
| JP | 2000-177354 | 6/2000 |
| JP | 2005-238972 | 9/2005 |

* cited by examiner

*Primary Examiner*—Paul N Dickson
*Assistant Examiner*—Laura Freedman
(74) *Attorney, Agent, or Firm*—Oblon, Spivak, McClelland, Maier & Neustadt, L.L.P.

(57) ABSTRACT

When the side acceleration acting upon a vehicle body is comparatively small, the roll rigidities of a front wheel suspension device and a rear wheel suspension device are mainly controlled based upon their roll angles; while, when this side acceleration is comparatively large, the roll rigidities of the front wheel suspension device and the rear wheel suspension device are mainly controlled based upon the correlation between the roll rigidity of the front wheel suspension and the roll rigidity of the rear wheel suspension device.

19 Claims, 5 Drawing Sheets

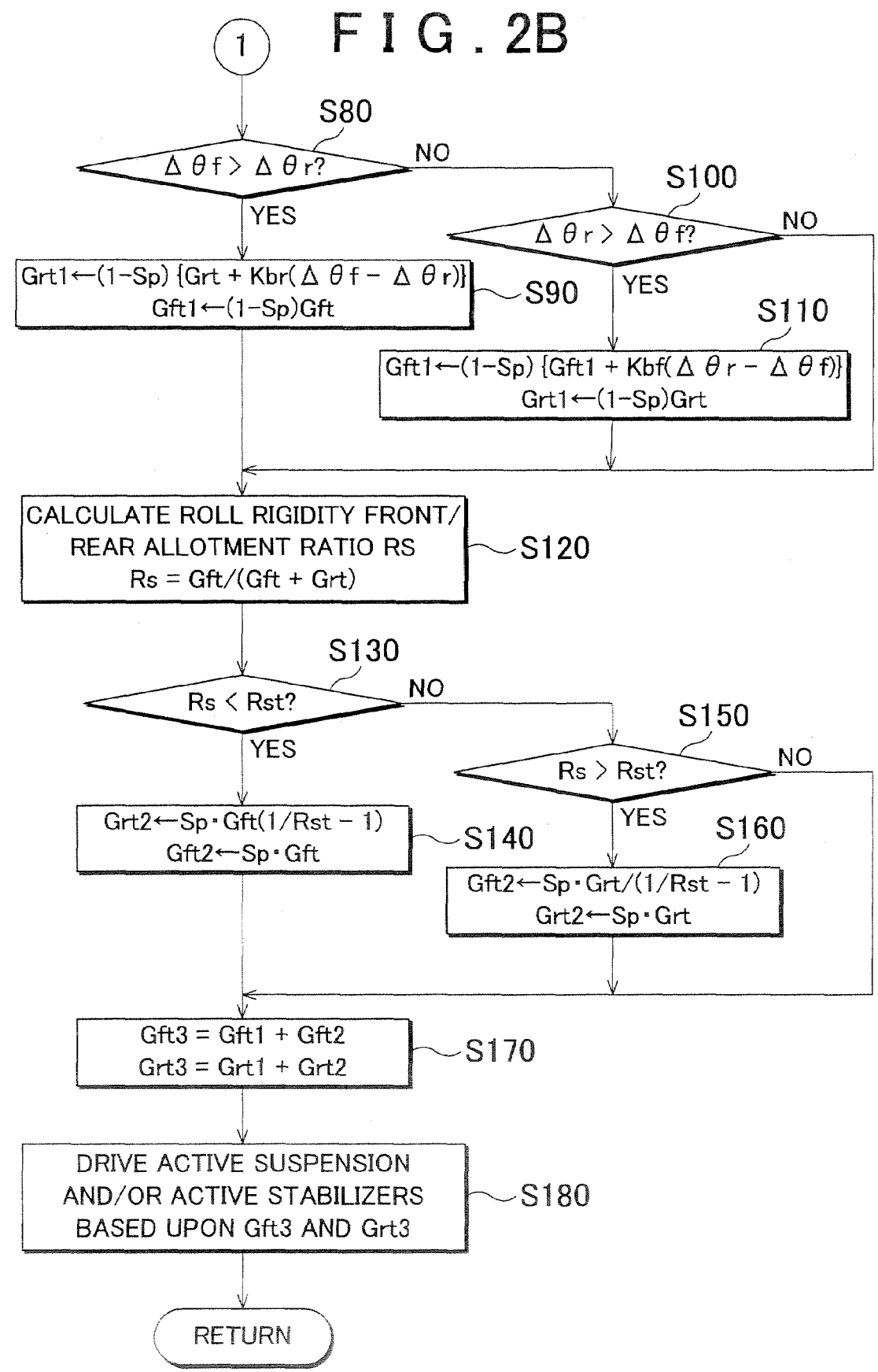

VEHICLE WITH COMBINED ROLL ANGLE CONTROL AND ROLL RIGIDITY FRONT/REAR ALLOTMENT RATIO CONTROL, AND CONTROL METHOD FOR THE SAME

The disclosure of Japanese Patent Application No. 2005-294662 filed on Oct. 7, 2005 including the specification, drawings and abstract is incorporated herein by reference in its entirety.

BACKGROUND OF THE INVENTION

1. Field of the Invention

The present invention relates to a four wheeled vehicle such as an automobile or the like which is endowed with a function of changing roll angle control mode according to the magnitude of the side acceleration acting upon the vehicle body, and to a control method for such a vehicle.

2. Description of the Related Art

With a four wheeled vehicle such as an automobile or the like, when the vehicle is running around a curve, due to lateral force such as centrifugal force acting upon the vehicle body, rolling occurs in which the vehicle body tilts towards the outside of the curve, with a difference in the vertical deflection of the left and right suspension devices of the vehicle being set up. As this rolling increases, an increasing reaction force is generated; and stabilizers are per se known as means for preventing the vehicle body from rolling to an excessive extent. Furthermore, as such a stabilizer, there is a per se known type of active stabilizer which is provided with an actuator, and which is made so that its anti-roll force can be variably adjusted. According to this type of active stabilizer, it is possible to adjust the roll rigidity, which is indicative of the anti-roll characteristic of the vehicle body, in a variable manner according to the magnitude of the lateral force which acts upon the vehicle body, and, furthermore, by doing this, it is possible to control the magnitude of the roll angle to which the vehicle body rolls in a variable manner, according to the magnitude of the lateral force which acts upon the vehicle body.

Furthermore, with regard to variable control of the roll rigidity and the roll angle of the vehicle body, if the vehicle wheel suspension devices are provided with active suspension units, like air springs, which are able to control their spring force in a variable manner, then this type of control operation also becomes available.

On the other hand, with regard to the roll rigidity of the vehicle wheel suspension devices, the larger this roll rigidity is, the smaller is the tilting of the vehicle body to the outside of a curve around which it is running, but, along with the rolling of the vehicle body, the greater is this rolling, the more does the ground contact load upon the vehicle wheels shift to the outside of the curve, and the allotment of the ground contact load between the left and right vehicle wheels becomes more greatly biased towards the outside of the curve. Since, as shown in FIG. 6, the increase of the cornering force upon the vehicle wheels with respect to increase of the ground contact load upon the vehicle wheels exhibits a non linear characteristic which curves towards saturation in an upwardly convex shape, accordingly the total cornering force upon the left and right vehicle wheels becomes smaller along with greater bias of the allotment of the ground contact load between the left and right vehicle wheels from a state of 50:50 equilibrium (in the example shown in the figure, through 40:60, 30:70, 20:80).

With a four wheeled vehicle, the relative magnitude relationship between the magnitude of the cornering force upon the front wheels and the magnitude of the cornering force upon the rear wheels affects the steering responsiveness of the vehicle. In other words, when the cornering force upon the front wheels becomes small as correlated with the cornering force upon the rear wheels, the vehicle exhibits an understeering characteristic; but conversely, when the cornering force upon the rear wheels becomes small as correlated with the cornering force upon the front wheels, the vehicle exhibits an oversteering characteristic. Since, according to the above, the cornering force is affected by the roll rigidity, the relative magnitude relationship between the roll rigidity of the front wheel suspension devices and the roll rigidity of the rear wheel suspension devices affects the steering responsiveness of the vehicle. Various methods have been proposed for controlling this relative magnitude relationship between the roll rigidity of the front wheel suspension devices and the roll rigidity of the rear wheel suspension devices, which may be termed the roll rigidity front/rear allotment ratio, in various ways. For example, in Japanese Patent Publication No. JP-A-2-193749, it is described to perform control by establishing a relationship between the roll rigidity ratio between the front wheels and the rear wheels, and the braking force upon the rear wheels.

In Japanese Patent Publication No. JP-A-2-193749, apart from the gist of that invention, in the description of an embodiment, the concept is included of, in connection with control of the above described roll rigidity ratio, also performing control so as to determine the control amount with reference to a target roll angle. However, the desirable target value for the roll angle and the desirable target value for the roll rigidity front/rear ratio do not necessarily match one another, and, as a general rule, it is difficult to perform control while giving serious consideration to both of them at the same time. Furthermore, if both of these parameters are controlled at the same time, there is a danger that large control errors will occur due to interference taking place between them. On the other hand, roll angle control is particularly effective when the vehicle is running around a curve at comparatively low speed, so that the driver has a margin of attention for considering the inclination of the vehicle body. However, when the vehicle is running around a curve at a speed which is higher than a certain level, what is the matter of most concern from the point of view of the driver is the steering responsiveness of the vehicle, i.e. how the vehicle responds to being steered.

SUMMARY OF THE INVENTION

The object of the present invention is to provide a vehicle in which control of the roll angle and control of the roll rigidity front/rear allotment ratio are combined, providing the beneficial effect of a high degree of control without the generation of control instability, and to provide a control method thereof.

A first aspect of the present invention relates to a vehicle which includes a front wheel portion roll rigidity impartation device which is able to impart roll rigidity to a front wheel suspension device in a variable manner, a rear wheel portion roll rigidity impartation device which is able to impart roll rigidity to a rear wheel suspension device in a variable manner, and a roll rigidity control device which controls the operation of the front wheel portion roll rigidity impartation device and of the rear wheel portion roll rigidity impartation device, and in which the roll rigidity control device performs control in different modes, according to the side acceleration which is acting upon the vehicle body. When the above described side acceleration is comparatively small, the roll rigidity control device controls the operation of the front wheel portion roll rigidity impartation device and of the rear wheel portion roll rigidity impartation device mainly based upon the roll angles of the front wheel suspension device and the rear wheel suspension device; while, when this side acceleration is comparatively large, it controls the operation of the front wheel portion roll rigidity impartation device and of the rear wheel portion roll rigidity impartation device, mainly based upon the correlation between the roll rigidity of the front wheel suspension device and the roll rigidity of the rear wheel suspension device.

According to this first aspect of the present invention, when the side acceleration which is acting upon the body of the vehicle is comparatively small, and suitably suppressing the roll angle can be effective from the point of view of enhancing the riding feeling of the vehicle, mainly the roll angles of the front wheel suspension device and the rear wheel suspension device are controlled to desirable values in consideration of the side acceleration; while, when the side acceleration is comparatively large, and the magnitude of the oversteer/understeer characteristic of the vehicle becomes a very important consideration, the correlation of the roll rigidity of the front wheel suspension device and the roll rigidity of the rear wheel suspension device is controlled, so that, thereby, it is possible to maintain the steering responsiveness of the vehicle in an appropriate manner. Moreover, it is possible to execute both these types of control without creating any type of interference at all between them.

It would also be possible to make this roll rigidity control device, when controlling the operation of the front wheel portion roll rigidity impartation device and of the rear wheel portion roll rigidity impartation device mainly based upon the roll angles of the front wheel suspension device and the rear wheel suspension device, and when one of the roll angle of the front wheel suspension device and the roll angle of the rear wheel suspension device is larger than the other, increase the roll rigidity impartation target value of the roll rigidity impartation device for that vehicle wheel suspension device for which the roll angle is the smaller.

By doing this, if the roll angle on the side of the one of the roll rigidity impartation devices has become larger than the roll angle on the side of the other one thereof, due to an operational delay occurring in the correlation between the front wheel portion roll rigidity impartation device and the rear wheel portion roll rigidity impartation device, or due to either one of them reaching its limit of active operation before the other one, so that the roll rigidity which is imparted by one of these roll rigidity impartation devices is deficient as compared with the roll rigidity which is imparted by the other of these roll rigidity impartation devices, then this is supplemented by increasing the roll rigidity impartation target value of the roll rigidity impartation device on the other side, so that it is possible to approach the roll angle as much as possible to its predetermined target value.

Furthermore, it would also be acceptable for the relative magnitudes of the roll rigidity impartation target values to be determined according to the relative magnitude of the difference between the larger of the roll angles and the smaller of the roll angles.

By doing this it is possible, in correspondence to the magnitude of the above described difference, to supplement the roll rigidity impartation device of the front wheel portion or the rear wheel portion, in which an operational delay has occurred or whose active operation has reached its limit, with the other roll rigidity impartation device.

Furthermore, it would also be acceptable for the roll rigidity control device, when controlling the operation of the front wheel portion roll rigidity impartation device and of the rear wheel portion roll rigidity impartation device mainly based upon the correlation between the roll rigidity of the front wheel suspension device and the roll rigidity of the rear wheel suspension device, to perform control so as to bring the correlation towards a target roll rigidity front/rear allotment ratio which has been calculated based upon the running state of the vehicle. It should be understood that, as will be explained subsequently in more detail in connection with an embodiment of the present invention, a "roll rigidity front/rear allotment ratio" is defined as being the ratio of the roll rigidity of the front wheel suspension device to the sum of the roll rigidity of the front wheel suspension device and the roll rigidity of the rear wheel suspension device.

If this is done, it is possible to control the steering responsiveness of the vehicle in an appropriate manner by calculating a target roll rigidity front/rear allotment ratio based upon the running state of the vehicle as a value which is appropriate from the aspect of the steering responsiveness of the vehicle.

Furthermore, it would also be acceptable to arrange for the roll rigidity control device, when the actual roll rigidity front/rear allotment ratio is smaller than the target roll rigidity front/rear allotment ratio, to perform control so as to lower the roll rigidity of the rear wheel suspension device.

The fact that the actual roll rigidity front/rear allotment ratio is smaller than the target roll rigidity front/rear allotment ratio, suggests that a delay in the operation of the front wheel portion roll rigidity impartation device as correlated with the operation of the rear wheel portion roll rigidity impartation device is occurring, or that the front wheel portion roll rigidity impartation device has arrived at the limit of its active operation before the rear wheel portion roll rigidity impartation device. Accordingly, by reducing the rigidity which is imparted by the rear wheel portion roll rigidity impartation device in this manner, it is possible to bring the actual roll rigidity front/rear allotment ratio close to the target roll rigidity front/rear allotment ratio.

For example, it would also be acceptable, denoting the target roll rigidity front/rear allotment ratio by Rst and the roll rigidity of the front wheel suspension means by Gf, for the roll rigidity control means to make the roll rigidity impartation target value Gr for the rear wheel suspension means be $Gr=Gf(1/Rst-1)$.

Or, furthermore, it would also be acceptable to arrange for the roll rigidity control device, when the actual roll rigidity front/rear allotment ratio is larger than the target roll rigidity front/rear allotment ratio, to perform control so as to lower the roll rigidity of the front wheel suspension device.

The fact that the actual roll rigidity front/rear allotment ratio is larger than the target roll rigidity front/rear allotment ratio, suggests that a delay in the operation of the rear wheel portion roll rigidity impartation device as correlated with the operation of the front wheel portion roll rigidity impartation device is occurring, or that the rear wheel portion roll rigidity impartation device has arrived at the limit of its active operation before the front wheel portion roll rigidity impartation device. Accordingly, by reducing the rigidity which is imparted by the front wheel portion roll rigidity impartation device in this manner, it is possible to bring the actual roll rigidity front/rear allotment ratio close to the target roll rigidity front/rear allotment ratio.

For example, it would also be acceptable, denoting the target roll rigidity front/rear allotment ratio by Rst and the roll rigidity of the rear wheel suspension means by Gr, for the roll rigidity control means to make the roll rigidity impartation target value Gf for the front wheel suspension means be $Gf=Gr(1/Rst-1)$.

Moreover, it would also be acceptable to arrange for the roll rigidity control device, according to increase of a target roll rigidity front/rear allotment degree of control priority which corresponds to increase of the side acceleration which acts upon the body of the vehicle, to operate so as to gradually decrease the control amount by which it controls the operation of the front wheel portion roll rigidity impartation device and the rear wheel portion roll rigidity impartation device, mainly based upon the roll angles of the front wheel suspension device and the rear wheel suspension device, and so as to gradually increase the control amount by which it controls the operation of the front wheel portion roll rigidity impartation device and the rear wheel portion roll rigidity impartation device, mainly based upon the correlation between the roll rigidity of the front wheel suspension device and the roll rigidity of the rear wheel suspension device; thus changing its control mode between a control in which it controls the operation of the front wheel portion roll rigidity impartation device and the rear wheel portion roll rigidity impartation device mainly based upon the roll angles of the front wheel suspension device and the rear wheel suspension device, and a control in which it controls the operation of the front wheel portion roll rigidity impartation device and the rear wheel portion roll rigidity impartation device mainly based upon the correlation between the roll rigidity of the front wheel suspension device and the roll rigidity of the rear wheel suspension device.

If this is done, it is possible to perform changeover of the control mode between roll angle control and front and rear wheel portion roll rigidity correlation control in a smooth manner.

Furthermore, according to a second aspect of the present invention, there is proposed a control method for a vehicle which comprises a front wheel portion roll rigidity impartation means which is able to impart roll rigidity to a front wheel suspension means in a variable manner, and a rear wheel portion roll rigidity impartation means which is able to impart roll rigidity to a rear wheel suspension means in a variable manner, characterized by comprising: a step of detecting the side acceleration which acts upon the vehicle body; and a step of, when this side acceleration is comparatively small, controlling the operation of the front wheel portion roll rigidity impartation means and of the rear wheel portion roll rigidity impartation means mainly based upon the roll angles of the front wheel suspension means and the rear wheel suspension means; and, when this side acceleration is comparatively large, controlling the operation of the front wheel portion roll rigidity impartation means and of the rear wheel portion roll rigidity impartation means, mainly based upon the correlation between the roll rigidity of the front wheel suspension means and the roll rigidity of the rear wheel suspension means.

According to this second aspect of the present invention, when the side acceleration which is acting upon the body of the vehicle is comparatively small, and suitably suppressing the roll angle can be effective from the point of view of enhancing the riding feeling of the vehicle, mainly the roll angles of the front wheel suspension device and the rear wheel suspension device are controlled to desirable values in consideration of the side acceleration; while, when the side acceleration is comparatively large, and the magnitude of the oversteer/understeer characteristic of the vehicle becomes a very important consideration, the correlation of the roll rigidity of the front wheel suspension device and the roll rigidity of the rear wheel suspension device is controlled, so that, thereby, it is possible to maintain the steering responsiveness of the vehicle in an appropriate manner. Moreover, it is possible to execute both these types of control without creating any type of interference at all between them.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2A, FIG. 2B are flow charts showing the way in which the combination of roll angle control and roll rigidity front/rear allotment ratio control is performed according to this embodiment;

DETAILED DESCRIPTION OF THE PREFERRED EMBODIMENTS

Figure 1:
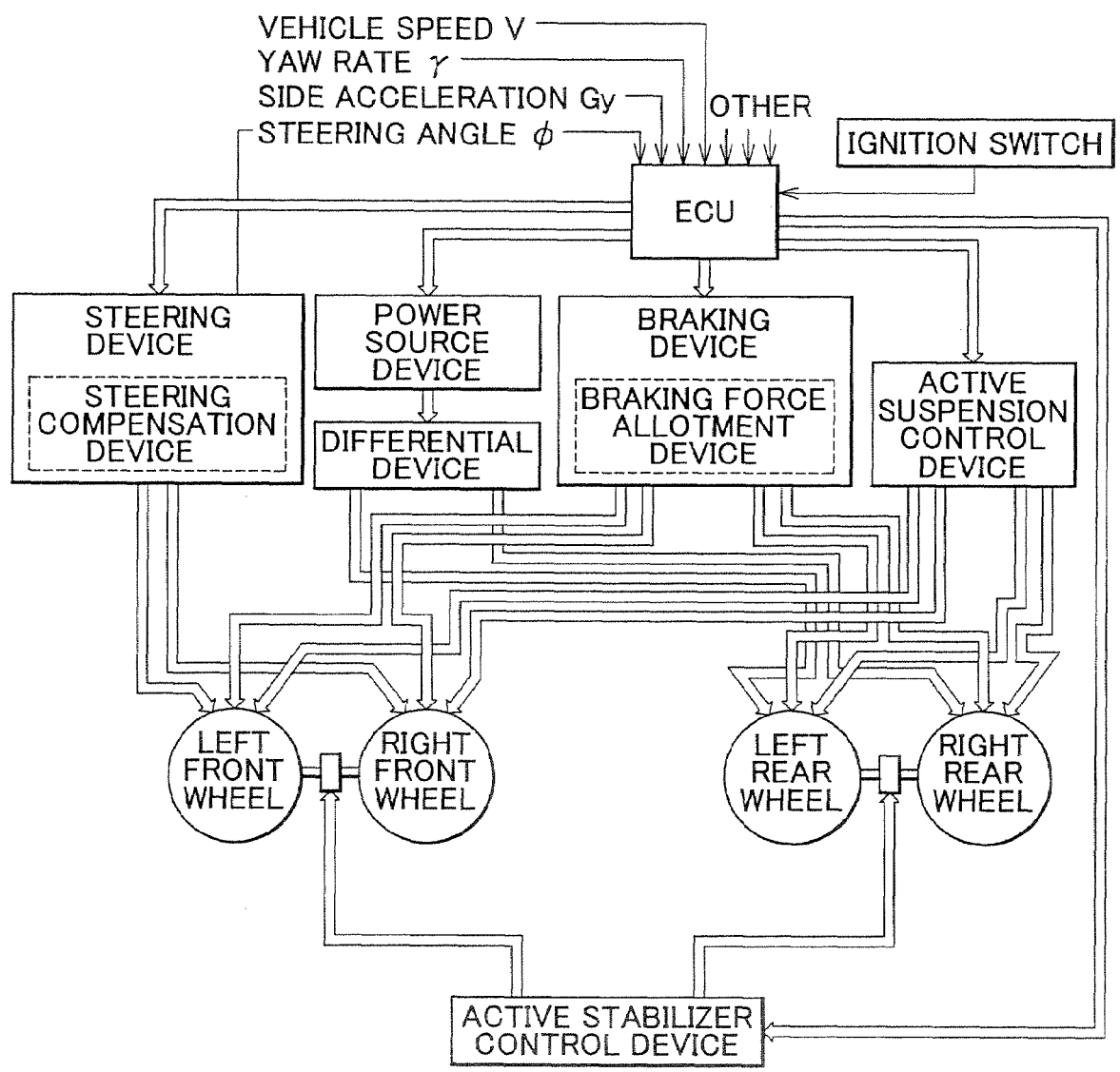
FIG. 1 is a schematic figure related to an embodiment of the present invention, and showing in block diagram form fundamental elements of a vehicle related to the running thereof, including structures involved in the present invention.

FIG. 1 is a figure which relates to an embodiment of the present invention, and shows in block diagram form fundamental elements of a vehicle related to the running thereof, including structures involved in the present invention. However, the present invention is a software article related to a combination of roll angle control and roll rigidity front/rear allotment ratio control when a vehicle is running around a curve.

As seen in the figure, this vehicle comprises a left front wheel, a right front wheel, a left rear wheel, and a right rear wheel; and these are suspended by respective vehicle wheel suspension devices not shown in the figures to the body of the vehicle, also not shown in the figures. The suspension device for each of the vehicle wheels comprises a respective suspension spring and a respective shock absorber. The height of each of the wheels, and the attenuation coefficient of each of the shock absorbers, are controlled by an active suspension control device so as to be individually variable. An active stabilizer is provided between the left front wheel and the right front wheel, and, similarly, an active stabilizer is provided between the left rear wheel and the right rear wheel. The twist angle of each of these front and rear active stabilizers is individually controlled by a corresponding active stabilizer control device so as to be variable, and the roll rigidity of each of the front wheel suspension devices and the rear wheel suspension devices is individually changed in a variable manner. The roll rigidities of the front wheel suspension devices and the rear wheel suspension devices are variably controlled by the operation of the active suspension control devices and the active stabilizer control devices, or by the operation of either one thereof.

As shown in the figure, this vehicle is a two wheel drive type vehicle which is driven only by the rear wheels, and the left rear wheel and the right rear wheel are driven via a differential device by some type of power device which includes an internal combustion engine. Furthermore, as shown in the figure, this vehicle is a front wheel steering type vehicle. The left front wheel and the right front wheel are individually steered by a steering device in some manner. Of course, this steering device may include a steering compensation device which is capable of compensating the steering angles of the steering wheels according to steering by the driver.

Moreover, the left front wheel, the right front wheel, the left rear wheel, and the right rear wheel are individually braked, according to the braking intentions of the driver and according to automatic braking control, by a braking device which includes a braking force allotment device which is able to allot braking force by selection between individual ones of the vehicle wheels, again in various modes.

The operation of each of the steering device, the power source device, and the braking device described above is respectively controlled according to actuation by the driver of a steering wheel, an accelerator pedal, and a brake pedal not shown in the figure; and, in addition, the operations of these devices are automatically controlled in correspondence with the operational state of the vehicle, in various manners, according to a turning behavior control program which employs an electronic control device (an ECU) comprising a micro computer. This electronic control device also controls the active suspension control devices and the active stabilizer control devices to the desired effect, according to the operational state of the vehicle; and, apart from varying the attenuation coefficients of the active shock absorbers and the twist angles of the active stabilizers, it also controls the active suspensions and the active stabilizers, or either one thereof, according to the concept of this embodiment of the present invention as explained below.

This electronic control device either operates or stops operating, according to an ON/OFF command for vehicle operation by an ignition switch, which functions as a vehicle driving switch. Various signals are supplied to this electronic control device, such as signals from a vehicle speed sensor, a yaw rate sensor, a side acceleration sensor, and a steering angle sensor (none of which are shown in the figures) which respectively indicate the vehicle speed V, the yaw rate $\gamma$ of the vehicle body, the side acceleration Gy which acts upon the vehicle body due to centrifugal force and the like when the vehicle is running around a curve, and the steering angle $\phi$, and also other signals which are required for automatic control by the electronic control device.

Figure 2A:
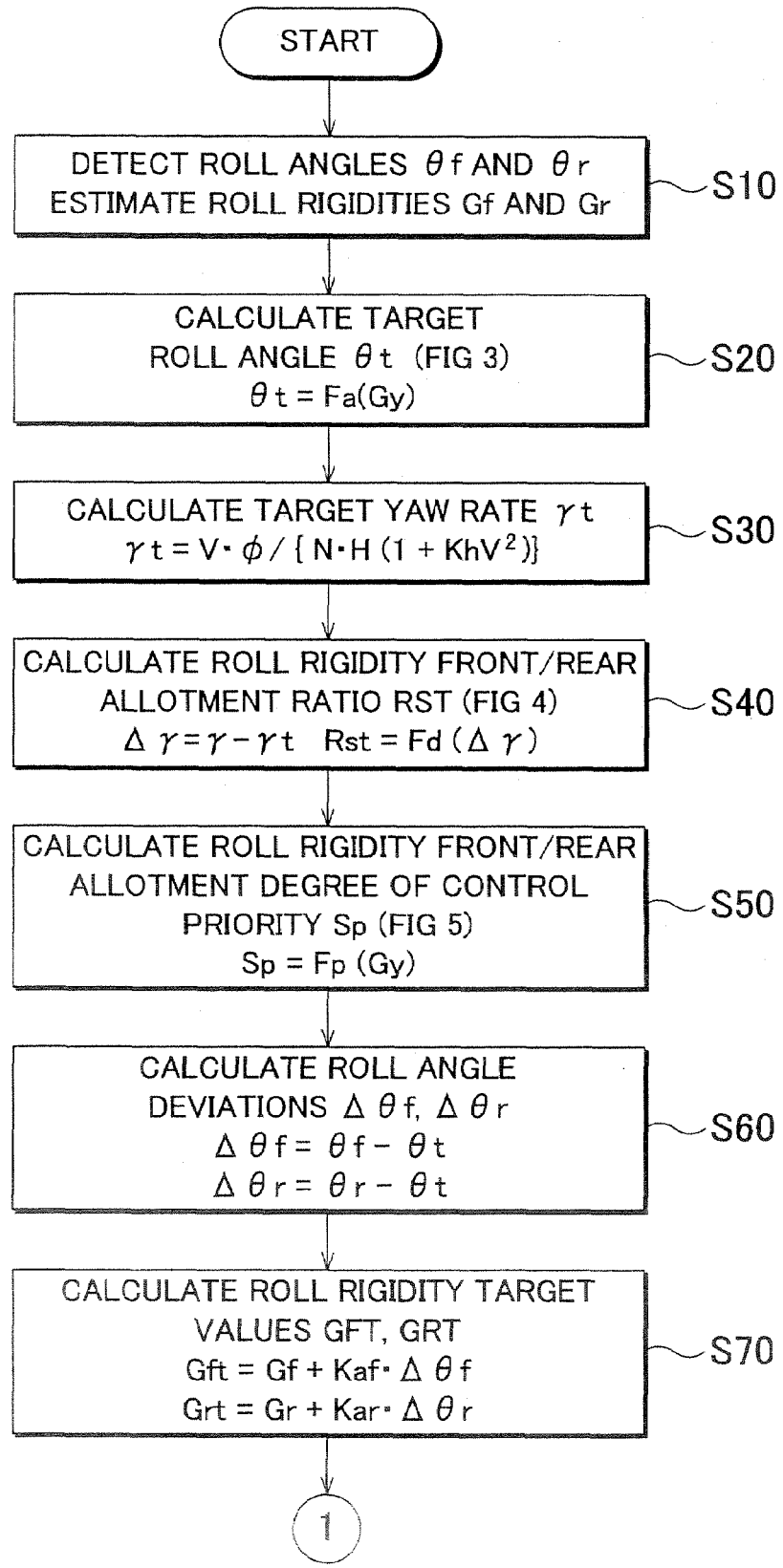

FIG. 2A, FIG. 2B are flow charts showing the combination manner of roll angle control and roll rigidity front/rear allotment ratio control which is performed according to this embodiment, in a vehicle having the structure shown in FIG. 1. The control according to this flow chart may be repeated at a cycle of some tens to some hundreds of milliseconds while the vehicle is running.

When control is started, each time repetition of this control according to this flow chart is performed, reading in of the values of various parameters from various types of sensors and actuators and so on is performed by the electronic control device. First, in a step 10, the roll angles $\theta f$ and $\theta r$ of the front wheel suspension device and the rear wheel suspension device are detected by appropriate roll angle sensors. Moreover, in this step 10, for example, basic values Gf and Gr are estimated for the roll rigidities which are to be imparted to the front wheel suspension device and to the rear wheel suspension device by a front wheel portion roll rigidity impartation device and a rear wheel portion roll rigidity impartation device which are constituted by the active suspensions and the active stabilizers, based upon the history of control of the active suspensions and the active stabilizers by the active suspension control device and/or the active stabilizer control device, and upon a design model.

Figure 3:
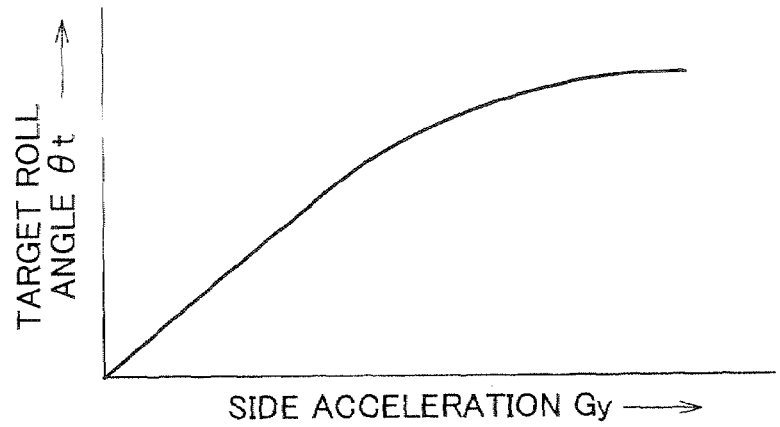
FIG. 3 is a figure showing an example of a map which is referred to in a step 20 of the FIG. 2A, FIG. 2B flow chart.

Next, the flow of control proceeds to the step 20. Here, a target roll angle $\theta t$ which should be generated by the front wheel suspension device and the rear wheel suspension device according to the side acceleration Gy is calculated as the function value of an appropriate function Fa(Gy) based upon Gy. For example, this may be obtained by reference to a map like the one shown in FIG. 3.

Next, the flow of control proceeds to the step 30. Based upon the vehicle speed V and the steering angle $\phi$ of the steering wheel, a target yaw rate $\gamma t$ is calculated according to the equation described below. N is the gear ratio of the steering device, H is the wheel base of the vehicle, and Kh is a stability factor.

$$\gamma t = V \cdot \theta / \{N \cdot H(1 + Kh V^2)\}$$

Figure 4:
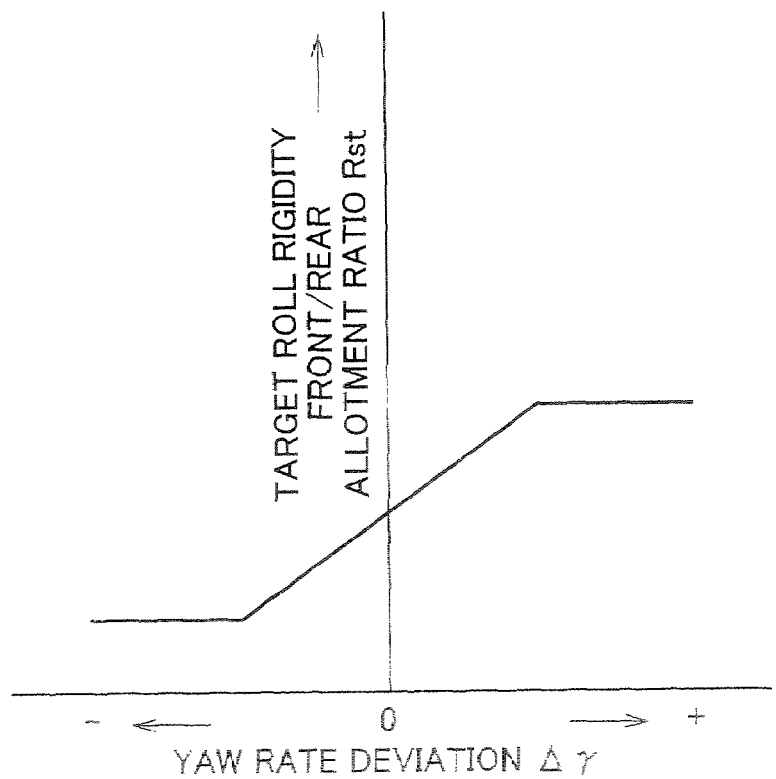
FIG. 4 is a figure showing an example of a map which is referred to in a step 40 of the FIG. 2A, FIG. 2 flow chart.
Figure 6:
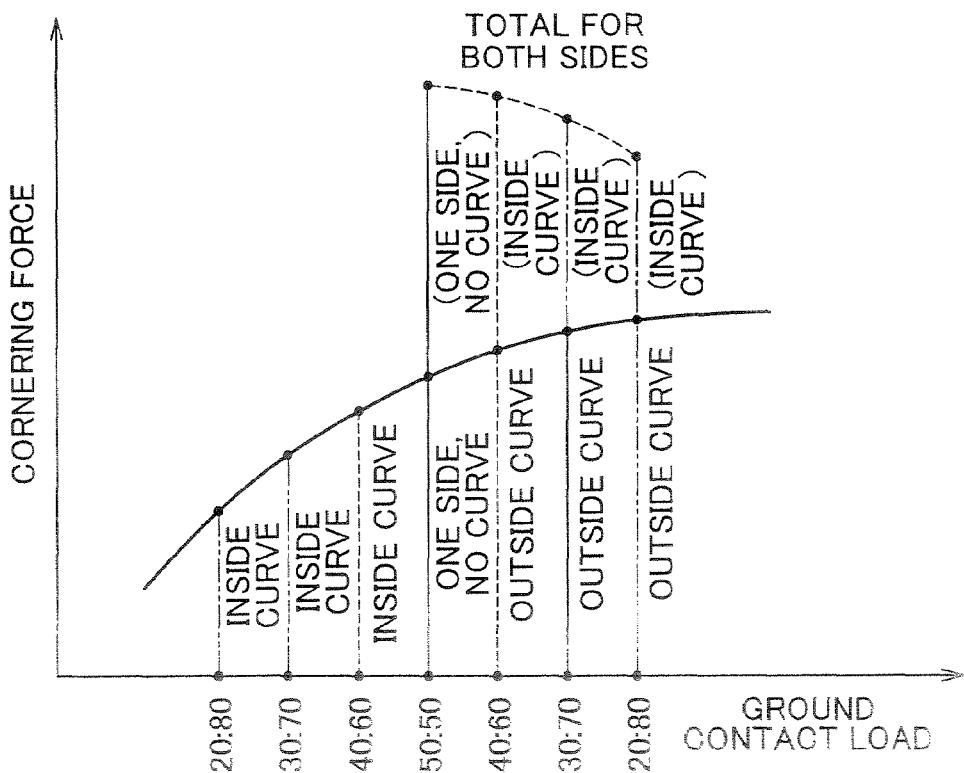
FIG. 6 is a figure showing the relationship between the increase of the cornering force upon the vehicle wheels with respect to increase of the ground contact load of the vehicle wheels, and how the total of the cornering force of both the left and right wheels is affected according to the roll rigidity.

Next, the flow of control proceeds to the step 40. Here, based upon the deviation $\Delta \gamma = \gamma - \gamma t$ of the yaw rate $\gamma$ with respect to the target yaw rate $\gamma t$, a target roll rigidity front/rear allotment ratio Rst is calculated as a function value, according to an appropriate function Fd($\Delta \gamma$). This, for example, may be obtained by reference to a map like the one shown in FIG. 4. As already described, in this case, the "roll rigidity front/rear allotment ratio" is the ratio of the roll rigidity of the front wheel suspension device to the sum of the roll rigidity of the front wheel suspension device and the roll rigidity of the rear wheel suspension device. In other words, if this roll rigidity front/rear allotment ratio is denoted by Rs, then Rs=Gf/(Gf+ Gr). And the target roll rigidity front/rear allotment ratio Rst is a target value for the roll rigidity front/rear allotment ratio Rs with respect to the yaw rate deviation $\Delta \gamma$, which will yield an understeer/oversteer characteristic which it is thought to be desirable from the point of view of adequately controlling the responsiveness of the steering while the vehicle is running around a curve. As has been explained above with reference to FIG. 6, the total of the cornering forces of the left and right pairs of vehicle wheels decreases as the shift of the ground contact load to the outside of the curve becomes larger. On the other hand, the shift of the ground contact load to the outside of the curve becomes larger as the roll rigidity exhibited by the left and right pair of vehicle wheel suspension devices becomes greater. Accordingly, as shown in FIG. 4, the stronger the oversteering tendency of the vehicle becomes, in other words the greater $\Delta \gamma$ becomes, so that the roll rigidity of the front wheel suspension device increases and the cornering force upon the front wheels diminishes, the greater does Rst become, or, conversely, it would also be acceptable to arrange for Rst to become the smaller, the stronger the understeering tendency of the vehicle becomes, in other words the smaller $\Delta \gamma$ becomes (i.e. while it remains negative, the greater its absolute value becomes), so that the roll rigidity of the rear wheel suspension device increases and the cornering force upon the rear wheels diminishes.

Figure 5:
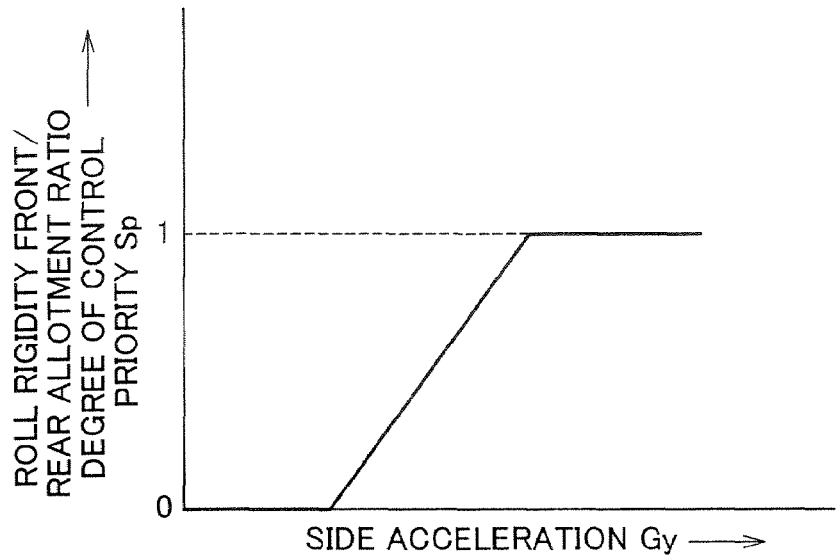
FIG. 5 is a figure showing an example of a map which is referred to in a step 50 of the FIG. 2A, FIG. 2B flow chart.

Next, the flow of control proceeds to the step 50. A value which constitutes a roll rigidity front/rear allotment degree of control priority Sp is obtained, based upon the side acceleration Gy, as the value of a function, according to an appropriate function Fp(Gy). For example, this may be obtained by reference to a map like the one shown in FIG. 5. As will be understood from the map of FIG. 5, the value of this roll rigidity front/rear allotment degree of control priority Sp is zero when the side acceleration Gy is less than or equal to some comparatively small value, and gradually increases from zero to unity as the side acceleration Gy increases from that small value, becoming unity when the value of the side acceleration Gy is greater than or equal to some comparatively large value.

Next, the flow of control proceeds to the step 60. Here, the deviations Δθf and Δθr of the roll angles θf and θr of the front wheel suspension device and the rear wheel suspension device with respect to the target roll angle θt are calculated as being, respectively, Δθf=θf−θt and Δθr=θr−θt.

Next, the flow of control proceeds to the step 70. Here, based upon the roll angle deviations Δθf and Δθr which were calculated above, target values Gft and Grt of roll rigidities, for controlling the roll rigidities of the front wheel suspension device and the rear wheel suspension device so as to annihilate these roll angle devations Δθf and Δθr, are calculated with appropriate coefficients Kaf and Kar, according to the following equations:

$$Gft=Gf+Kaf \cdot \Delta \theta f$$

$$Grt=Gr+Kar \cdot \Delta \theta r$$

Next, the flow of control proceeds to the step 80, in which a decision is made as to whether or not the roll angle deviation Δθf of the front wheel suspension device is greater than the roll angle deviation Δθr of the rear wheel suspension device. An answer here of YES (Y) means that the roll angle of the front wheel suspension device is larger than the roll angle of the rear wheel suspension device. This means that the action of the front wheel portion roll rigidity impartation device is delayed with respect to the action of the rear wheel portion roll rigidity impartation device, or that the front wheel portion roll rigidity impartation device arrives at the limit of its possible operation earlier than does the rear wheel portion roll rigidity impartation device, so that the roll rigidity which is imparted to the front wheel suspension device by the front wheel portion roll rigidity impartation device is deficient, as compared to the roll rigidity which is imparted to the rear wheel suspension device by the rear wheel portion roll rigidity impartation device.

At this time, the flow of control proceeds to the step 90. Here, the value calculated in the step 70 for the target value Grt for the roll rigidity of the rear wheel suspension device, by which the front wheel portion roll rigidity impartation device is to be supplemented by the rear wheel portion roll rigidity impartation device, is increased by just Kbr(Δθf−Δθr) (where Kbr is an appropriate positive coefficient), and furthermore this is multiplied by an allotment ratio, which is (1−Sp) in which the above described roll rigidity front/rear allotment degree of control priority Sp is used, and this is taken as being a roll rigidity target value Grt1 for roll angle control of the rear wheel suspension device. This allotment ratio (1−Sp) is the complement of the roll rigidity front/rear allotment degree of control priority Sp with respect to 1, and is 1 when the side acceleration Gy is less than or equal to some first value, is 0 when Gy is greater than or equal to some second value which is greater than the first value, and, when Gy is a value intermediate between those values, is a value which changes in the range 0~1 according to the value of Gy. In this case, the roll rigidity target value Gft1 for roll angle control of the front wheel suspension device is taken as being (1−Sp)Gft.

On the other hand, when the answer in the step 80 is NO (N), then the flow of control proceeds to the step 100, in which a decision is made as to whether or not the roll angle deviation Δθr of the rear wheel suspension device is greater than the roll angle deviation Δθf of the front wheel suspension device. An answer of YES here means that the roll angle of the rear wheel suspension device is greater than the roll angle of the front wheel suspension device. This means that the action of the rear wheel portion roll rigidity impartation device is delayed with respect to the action of the front wheel portion roll rigidity impartation device, or that the rear wheel portion roll rigidity impartation device arrives at the limit of its possible operation earlier than does the front wheel portion roll rigidity impartation device, so that the roll rigidity which is imparted to the rear wheel suspension device by the rear wheel portion roll rigidity impartation device is deficient, as compared to the roll rigidity which is imparted to the front wheel suspension device by the front wheel portion roll rigidity impartation device.

At this time, the flow of control proceeds to the step 110. Here, the value calculated in the step 70 for the target value Gft for the roll rigidity of the front wheel suspension device, by which the rear wheel portion roll rigidity impartation device is to be supplemented by the front wheel portion roll rigidity impartation device, is increased by just Kbf(Δθr−Δθf) (where Kbf is an appropriate positive coefficient), and furthermore this is multiplied by the allotment ratio (1−Sp), and this is taken as being a roll rigidity target value Gft1 for roll angle control of the front wheel suspension device. In this case, the roll rigidity target value Grt1 for roll angle control of the rear wheel suspension device is taken as being (1−Sp)Grt.

If the answer in the step 100 is NO (N), then the flow of control bypasses the step 110. Since, actually, Δθr is hardly ever equal to Δθf, either the step 90 or the step 110 is executed, according to the relative magnitude relationship of Δθr and Δθf.

In either of the above cases, next, the flow of control proceeds to the step 120. Here, a value Rs for the actual roll rigidity front/rear allotment ratio is calculated based upon the values Gft and Grt of the roll rigidity target values that were calculated in the step 70, according to the equation Rs=Gft/(Gft+Grt).

Next, the flow of control proceeds to the step 130, in which a decision is made as to whether or not this actual roll rigidity front/rear allotment ratio Rs is smaller than the target roll rigidity front/rear allotment ratio Rst which was calculated in the step 40. If the answer here is YES, then this means that the roll rigidity Gft of the front wheel suspension device is too small in relation to the roll rigidity Grt of the rear wheel suspension device, for the roll rigidity front/rear allotment ratio to become the target value Rst.

Thus, at this time, the flow of control proceeds to the step 140. Here, the target value Grt of the roll rigidity of the rear wheel suspension device is changed to Gft(1/Rst−1), in order for Rs to become equal to Rst, in other words, in order for Gft/(Gft+Grt) to become equal to Rst, and moreover this value is multiplied by the roll rigidity front/rear allotment degree of control priority Sp. Thus, the roll rigidity target value Grt2 for the rear wheel suspension device for roll rigidity front/rear allotment ratio control is made to be equal to Sp ·Gft(1/Rst−1). At this time, the roll rigidity target value Gft2 for the front wheel suspension device for roll rigidity front/rear allotment ratio control is made to be equal to Sp ·Gft.

On the other hand, if the answer in the step 130 is NO (N), then in a step 150 a decision is made as to whether or not this actual roll rigidity front/rear allotment ratio Rs is larger than the target roll rigidity front/rear allotment ratio Rst which was calculated in the step 40. If the answer here is YES, then this means that the roll rigidity Grt of the rear wheel suspension device is too small in relation to the roll rigidity Gft of the front wheel suspension device, for the roll rigidity front/rear allotment ratio to become the target value Rst. To put this in another manner, it means that the roll rigidity Gft of the front wheel suspension device is too large in relation to the roll rigidity Grt of the rear wheel suspension device.

Thus, at this time, the flow of control proceeds to the step 160. Here, the target value Gft of the roll rigidity of the front wheel suspension device is changed to Grt(1/Rst−1), in order for Rs to become equal to Rst, in other words, in order for Gft/(Gft+Grt) to become equal to Rst, and moreover this value is multiplied by the roll rigidity front/rear allotment degree of control priority Sp. Thus, the roll rigidity target value Gft2 for the front wheel suspension device for roll rigidity front/rear allotment ratio control is changed to Sp·Grt(1/Rst−1). At this time, the roll rigidity target value Grt2 for the rear wheel suspension device for roll rigidity front/rear allotment ratio control is made to be equal to Sp·Grt.

If the answer in the step 150 is NO (N), then the flow of control bypasses the step 160. Since, actually, Rs is hardly ever equal to Rst, either the step 140 or the step 160 is executed, according to the relative magnitude relationship of Rs and Rst.

In either of the above cases, next, the flow of control proceeds to the step 170. Here, by adding together the values Gft1 and Gft2 calculated above, and by adding together the values Grt1 and Grt2 calculated above, the final target values Gft3 and Grt3 for the roll rigidities of the front wheel suspension device and the rear wheel suspension device are calculated according to the following equations:

$$Gft3 = Gft1 + Gft2$$

$$Grt3 = Grt1 + Grt2$$

Next, the flow of control proceeds to the step 180. Here, both or either one of the active suspension control device and the active stabilizer control device is operated based upon the final target values Gft3 and Grt3 for the roll rigidities of the front wheel suspension device and the rear wheel suspension device, and, the roll rigidities of the front wheel suspension device and the rear wheel suspension device are controlled to become equal to their final target values Gft3 and Grt3 respectively.

Although, in the above, the present invention has been explained in detail in terms of one particular embodiment thereof, it will be understood that various changes could be made by a person skilled in the relevant art to the details of that embodiment, without departing from the scope of the present invention.

What is claimed is:

1. A vehicle, comprising:
   a front wheel portion roll rigidity impartation device that imparts a front roll rigidity to a front wheel suspension device in a variable manner;
   a rear wheel portion roll rigidity impartation device that imparts a rear roll rigidity to a rear wheel suspension device in a variable manner; and
   a roll rigidity control device which, according to a side acceleration which acts upon the vehicle:
     controls, in a first mode, an operation of the front wheel portion roll rigidity impartation device and of the rear wheel portion roll rigidity impartation device, primarily using a roll angle of the front wheel suspension device and a roll angle of the rear wheel suspension device; and
     controls, in a second mode, an operation of the front wheel portion roll rigidity impartation device and of the rear wheel portion roll rigidity impartation device, primarily using a correlation between the front roll rigidity of the front wheel suspension device and the rear roll rigidity of the rear wheel suspension device,
   wherein the side acceleration which acts upon the vehicle is smaller in the first mode than in the second mode.

2. A vehicle according to claim 1, wherein
   when the roll rigidity control device is controlling the operation of the front wheel portion roll rigidity impartation device and of the rear wheel portion roll rigidity impartation device primarily using the roll angle of the front wheel suspension device and the roll angle of the rear wheel suspension device in the first mode, and when one of the roll angle of the front wheel suspension device and the roll angle of the rear wheel suspension device is larger than the other, the roll rigidity control device increases a roll rigidity impartation target value of the roll rigidity impartation device for that vehicle wheel suspension device for which the roll angle is the smaller.

3. A vehicle according to claim 2, wherein a magnitude of the roll rigidity impartation target value is determined according to a magnitude of the difference between the larger of the roll angles and the smaller of the roll angles.

4. A vehicle according to claim 1, wherein
   when the roll rigidity control device is controlling the operation of the front wheel portion roll rigidity impartation device and of the rear wheel portion roll rigidity impartation device primarily using the correlation between the roll rigidity of the front wheel suspension device and the roll rigidity of the rear wheel suspension device in the second mode, the roll rigidity control device performs control so as to bring the correlation towards a target roll rigidity front/rear allotment ratio which has been calculated based upon a running state of the vehicle.

5. A vehicle according to claim 4, wherein
   when an actual roll rigidity front/rear allotment ratio is smaller than the target roll rigidity front/rear allotment ratio, the roll rigidity control device performs control so as to lower the roll rigidity of the rear wheel suspension device.

6. A vehicle according to claim 5, wherein
   denoting the target roll rigidity front/rear allotment ratio by Rst and the roll rigidity of the front wheel suspension device by Gf, the roll rigidity control device makes a target roll rigidity impartation value Gr for the rear wheel suspension device be Gr=Gf(1/Rst−1).

7. A vehicle according to claim 4, wherein
   when an actual roll rigidity front/rear allotment ratio is greater than the target roll rigidity front/rear allotment ratio, the roll rigidity control device performs control so as to lower the roll rigidity of the front wheel suspension device.

8. A vehicle according to claim 7, wherein
   denoting the target roll rigidity front/rear allotment ratio by Rst and the roll rigidity of the rear wheel suspension device by Gr, the roll rigidity control device makes a target roll rigidity impartation value Gf for the front wheel suspension device be Gf=Gr(1/Rst−1).

9. A vehicle according to claim 1, wherein
   according to an increase of a target roll rigidity front/rear allotment degree of control priority which corresponds to an increase of the side acceleration which acts upon the vehicle, the roll rigidity control device operates so as to gradually decrease the control amount by which the roll rigidity control device controls the operation of the front wheel portion roll rigidity impartation device and the rear wheel portion roll rigidity impartation device, primarily using the roll angles of the front wheel suspension device and the rear wheel suspension device, and so as to gradually increase the control amount by which the roll rigidity control device controls the operation of the front wheel portion roll rigidity impartation device and the rear wheel portion roll rigidity impartation device, primarily using the correlation between the roll rigidity of the front wheel suspension device and the roll rigidity of the rear wheel suspension device, thus gradually changing the roll rigidity control device control mode between a control in which the roll rigidity control device controls the operation of the front wheel portion roll rigidity impartation device and the rear wheel portion roll rigidity impartation device primarily using the roll angle of the front wheel suspension device and the roll angle of the rear wheel suspension device, and a control in which the roll rigidity control device controls the operation of the front wheel portion roll rigidity impartation device and the rear wheel portion roll rigidity impartation device primarily using the correlation between the roll rigidity of the front wheel suspension device and the roll rigidity of the rear wheel suspension device, from the first control mode to the second control mode.

10. A vehicle according to claim 1, wherein
according to the side acceleration which acts upon the vehicle, the roll rigidity control device:
  when the side acceleration is less than a predetermined value, controls the operation of the front wheel portion roll rigidity impartation device and of the rear wheel portion roll rigidity impartation device, primarily using the roll angle of the front wheel suspension device and the roll angle of the rear wheel suspension device in the first mode; and
  when the side acceleration is greater than the predetermined value, controls the operation of the front wheel portion roll rigidity impartation device and of the rear wheel portion roll rigidity impartation device, primarily using the correlation between the roll rigidity of the front wheel suspension device and the roll rigidity of the rear wheel suspension device in the second mode.

11. A control method for a vehicle which includes a front wheel portion roll rigidity impartation means which imparts a roll rigidity to a front wheel suspension means in a variable manner, and a rear wheel portion roll rigidity impartation means which imparts a roll rigidity to a rear wheel suspension means in a variable manner, the method comprising:
  detecting a side acceleration which acts upon the vehicle;
  controlling an operation of the front wheel portion roll rigidity impartation means and of the rear wheel portion roll rigidity impartation means in a first mode, primarily using a roll angle of the front wheel suspension means and a roll angle of the rear wheel suspension means when the side acceleration is less than a reference amount; and
  controlling an operation of the front wheel portion roll rigidity impartation means and of the rear wheel portion roll rigidity impartation means in a first mode, primarily using a correlation between the roll rigidity of the front wheel suspension means and the roll rigidity of the rear wheel suspension means when the side acceleration is greater than a reference amount.

12. The method according to claim 11, wherein when one of the roll angle of the front wheel suspension means and the roll angle of the rear wheel suspension means is larger than the other, the controlling in the first mode includes increasing a roll rigidity impartation target value of the roll rigidity impartation means for that vehicle wheel suspension means for which the roll angle is the smaller.

13. The method according to claim 12, wherein
  a magnitude of the roll rigidity impartation target value is determined according to a magnitude of the difference between the larger of the roll angles and the smaller of the roll angles.

14. The method according to claim 11, wherein the controlling in the second mode includes controlling the correlation towards a target roll rigidity front/rear allotment ratio which has been calculated based upon a running state of the vehicle.

15. The method according to claim 14, wherein when an actual roll rigidity front/rear allotment ratio is smaller than the target roll rigidity front/rear allotment ratio, the controlling in the second mode includes lowering the roll rigidity of the rear wheel suspension means.

16. The method according to claim 15, wherein denoting the target roll rigidity front/rear allotment ratio by Rst and the roll rigidity of the front wheel suspension means by Gf, the controlling in the second mode includes controlling a target roll rigidity impartation value Gr for the rear wheel suspension means to be $Gr=Gf(1/Rst-1)$.

17. The method according to claim 14, wherein when an actual roll rigidity front/rear allotment ratio is greater than the target roll rigidity front/rear allotment ratio, the controlling in the second mode includes lowering the roll rigidity of the front wheel suspension means.

18. The method according to claim 17, wherein denoting the target roll rigidity front/rear allotment ratio by Rst and the roll rigidity of the rear wheel suspension means by Gr, the controlling in the second mode includes controlling a target roll rigidity impartation value Gf for the front wheel suspension means to be $Gf=Gr(1/Rst-1)$.

19. The method according to claim 11, wherein according to an increase of a target roll rigidity front/rear allotment degree of control priority which corresponds to an increase of the side acceleration which acts upon the vehicle, the method further comprises:
  gradually decreasing the controlling in the first mode and gradually increasing the controlling in the second mode as the side acceleration which acts upon the vehicle increases, thus gradually changing from the first control mode to the second control mode as the side acceleration increases from less than the reference amount to greater than the reference amount.

* * * * *